United States Patent [19]

Muenstedt

[11] Patent Number: 4,869,949
[45] Date of Patent: Sep. 26, 1989

[54] FILMS OF ELECTRICALLY CONDUCTIVE POLYMERS

[75] Inventor: Helmut Muenstedt, Wachenheim, Fed. Rep. of Germany

[73] Assignee: BASF Aktiengesellschaft, Ludwigshafen, Fed. Rep. of Germany

[21] Appl. No.: 14,600

[22] Filed: Feb. 13, 1987

[30] Foreign Application Priority Data

Feb. 27, 1986 [DE] Fed. Rep. of Germany ....... 3606261

[51] Int. Cl.$^4$ ........................ B32B 27/00; C25C 1/00; C08F 8/00
[52] U.S. Cl. ................................... 428/216; 428/500; 428/521; 428/704; 204/242; 204/290 R; 427/121; 525/417
[58] Field of Search ............... 428/215, 500, 521, 704; 525/417; 427/121

[56] References Cited

U.S. PATENT DOCUMENTS 4,532,188  7/1985  Naarman et al. ............... 428/543 X
4,559,112 12/1985  Tamamura et al. ............ 428/500 X
4,578,433  3/1986  Muenstedt et al. .................. 525/417

Primary Examiner—P. C. Ives
Attorney, Agent, or Firm—Oblon, Spivak, McClelland, Maier & Neustadt

[57] ABSTRACT

A film of an electrically conductive polymer consists of (A) a layer I which is treated on one side with an aqueous acid and contains incorporated counterions and whose thickness is 1–60% of the total thickness of the film, and
(B) an electrochemically reversible oxidizable layer II whose thickness is 40–99% of the total thickness of the film.

22 Claims, 1 Drawing Sheet

FILMS OF ELECTRICALLY CONDUCTIVE POLYMERS

BACKGROUND OF THE INVENTION

1. Field of the Invention

The present invention relates to films of electrically conductive polymers and the use of such films as electrode material in electrochemical cells, and electrochemical cells containing such films.

2. Discussion of the Background

Over the past few years, the use of electrically conductive polymers as electrode material in primary and secondary cells has become increasingly important. For example, EP-A-36 118 describes electrochemical cells in which one or more electrodes consist of electrically conductive polymers.

The electrically conductive polymers are particularly suitable for use in secondary cells, and it has been possible to show that the charge capacity and the cycle life of some polymers reach values which are of interest in practice (cf. H. Münstedt in H. Kuzmany et al., Electronic Properties of Polymers and Related Compounds, Springer-Verlag, 1985, page 13).

Especially for use in secondary elements, it is necessary for the electrically conductive polymers to be capable of undergoing reversible oxidation. Electrochemical oxidation or reduction is accompanied by the reversible incorporation of counterions into the electrically conductive polymer or removal of these ions from the said polymer. However, all conductive polymers generally have the disadvantage that their conductivity falls with decreasing content of counterions or complexing agents. However, to achieve a high degree of discharge in a secondary cell or in an electrochemical cell, incorporation or removal must be as complete as possible, ideally to the neutral state of the polymer. The very low electrical conductivity of the polymers in the neutral or virtually neutral state necessitates the use of special conductors, as a rule metals or, for example, carbon fibers. This is necessary in order to ensure a conductivity sufficient for the speed of charge transport and hence also to ensure a good power density of the electrochemical cell.

However, there are a number of disadvantages involved in the mounting of special conductors. Many metals exhibit corrosion in the electrolyte solvents used; frequently, the continuous fastening of the conductor to the polymer material of the film over a large area presents difficulties, and, not least, the use of conductors is fairly expensive in terms of construction. The last-mentioned disadvantage is particularly undesirable in large-scale series production.

SUMMARY OF THE INVENTION

It is an object of the present invention to provide films of electrically conductive polymers which can be employed as electrode material in electrochemical cells without the use of a special conductor.

We have found that this object is achieved, according to the invention, by a film of an electrically conductive polymer consisting of (A) a layer I which is treated on one side with an aqueous acid and contains incorporated counterions and whose thickness is 1–60% of the total thickness of the film, and (B) an electrochemically reversibly oxidizable layer II whose thickness is 40–99% of the total thickness of the film.

BRIEF DESCRIPTION OF THE FIGURES

In the attached drawing.

DETAILED DESCRIPTION OF THE PREFERRED EMBODIMENTS

Preferably, the thickness of layer I is from 2 to 10% of the total thickness of the film. The electrically conductive polymer can be a polymer of pyrrole, of furan, of thiophene or of aniline.

The present invention also provides an electrochemical cell containing a film of the electrically conductive polymer provided by the present invention as an electrode material, and an organic electrolyte solvent.

The present invention also provides a process for the preparation of a film of an electrically conductive, polymer provided by the present invention. In this process, the film is treated on one side with an aqueous acid.

Figure 1:
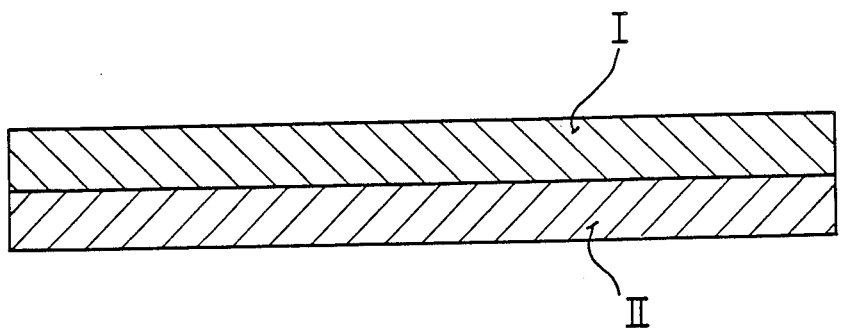
FIG. 1 shows a cross-section through a film according to the invention.
Figure 2:
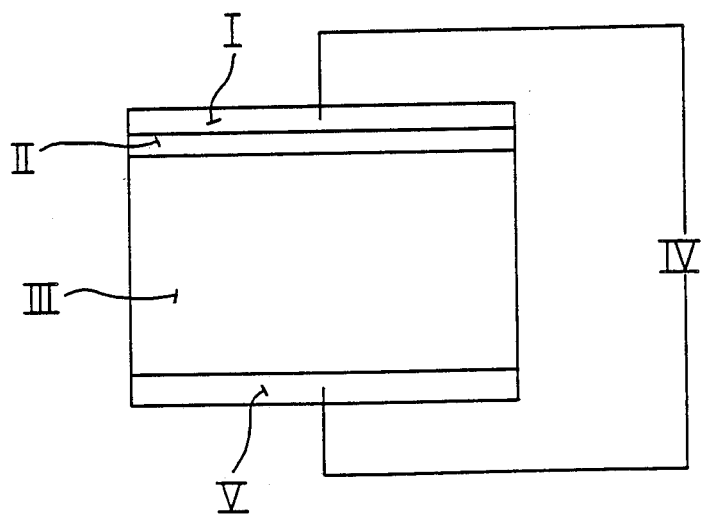
FIG. 2 shows a schematic diagram of an electrochemical cell which contains a novel film as the electrode.

The acid-treated layer I and the reversibly electrochemically oxidizable layer II can be seen in FIG. 1. FIG. 2 shows that, when the novel films are installed in an electrochemical cell, the acid-treated layer I is directly in contact with the direct current source IV or the load IV, and the layer II is in direct contact with the electrolyte III. Reference symbol V denotes the second electrode of the electrochemical cell.

The films according to the invention are distinguished in that they possess, along their cross-section, an acid-treated region having good conductivity and an untreated region whose electrical conductivity depends on the content of counterions.

German Laid-Open Application DOS 3,346,935 discloses a process for improving the stability of the electrical conductivity of pyrrole polymers, wherein the polymers are treated with aqueous acids. In this treatment, ion exchange takes place in polymers containing counterions; under the action of sulfuric acid, the incorporated complexing agent (counterion) of the electrically conductive polymer is replaced by the anion of sulfuric acid ($HSO_4^-$).

If a film treated in this manner is used as electrode material in an electrochemical cell containing an aqueous electrolyte, the general problem of falling conductivity with decreasing content of counterions is encountered. Surprisingly, an acid-treated film in which complete ion exchange has taken place cannot be subjected to reversible electrochemical discharge in an organic electrolyte solvent. Consequently, the conductivity is retained unchanged. At the same time, however, such a film is not suitable as the sole electrode material for reversible electrochemical cells.

Preferred monomers for the preparation of the electrically conductive polymers are 5-membered or 6-membered heterocycles containing oxygen, nitrogen or sulfur as hetero atoms and a conjugated $\pi$ electron system. Furan, thiophene and pyrrole and derivatives of these compounds may be mentioned here merely by way of example. Electrically conductive polymers of this type and processes for their preparation are described in the literature, so that further information is superfluous here. The polymer films can preferably be prepared by electrochemical polymerization of the monomers in the presence of complexing agents (counterions). Processes for electrochemical polymerization as well as suitable complexing agents are described in the literature (cf. German Laid-Open Applications DOS 3,428,843 and DOS 3,328,636). In addition to the abovementioned monomers, all monomers which can be converted to electrically conductive polymers are in principle suitable, with the precondition that the polymers are sufficiently stable to acids. Polymers of aniline may be mentioned here merely as typical examples.

It is of course also possible to prepare the polymers in solution in the presence of suitable catalysts and, if required, oxidizing agents and reducing agents, complexing agents once again advantageously being present during the polymerization.

It is in principle also possible to prepare novel films of electrically conductive polymers from polymers which are free of counterions. In this case, only the anions of the acids used are incorporated in the polymer during the acid treatment, without ion exchange taking place.

The acid-treated layer of the novel films is then prepared by treating one side or one surface of the film with an aqueous acid, as described in, for example, German Laid-Open Application DOS 3,346,935. Acids which have proven particularly useful are aqueous sulfuric acid or hydrochloric acid, whose pH should preferably be less than 4. The concentration of the acids used is in general from 0.1 to 50, preferably from 0.2 to 25, in particular from 0.2 to 10, % weight. In addition to sulfuric acid and hydrochloric acid, examples of other suitable acids are dilute phosphoric acid, acetic acid and trichloroacetic acid, to name but a few, provided the pH of the dilute solutions is less than 4. On the basis of past experience, it is important that aqueous acids are used for the treatment; if anhydrous, concentrated acids are used, the advantageous properties of the film are less pronounced. If necessary, the acids may furthermore contain organic solvents. The water content of the acids is preferably not less than 50%, in particular not less than 90%.

As stated above, this treatment results in exchange of the complexing agent or counterion incorporated in the polymer for the anion of the acid used, e.g. $HSO_4^-$ where sulfuric acid is used. The depth of penetration and hence the thickness of the acid-treated region can be controlled both by the acid concentration and by the treatment time. It is clear that these two parameters are dependent on one another, and a suitable combination must be chosen in order to achieve the desired thickness of the treated layer or penetration depth. In general, treatment times of from 1 to 30 minutes are sufficient at an acid concentration of from 0.1 to 50% by weight in order to obtain acid-treated layers from 2 to 20 $\mu$m thick, i.e. a 1% strength by weight acid leads to an acid-treated layer about 1 $\mu$m thick when treatment is carried out for 1 minute. For a given acid concentration and a given treatment time, the depth of penetration is of course also dependent on the temperature, the physical conditions and the type of acid used. The atmospheric humidity in the system and any other components present may be mentioned merely as examples of physical conditions which influence the depth of penetration.

The thickness of the acid-treated layer is from 1 to 60%, in particular from 2 to 10%, of the total thickness of the film of electrically conductive polymers used. In conjunction with the usual film thicknesses of from 10 to 150 $\mu$m, this corresponds to thicknesses of acid-treated regions of, preferably, from 0.1 to 90 $\mu$m, in particular from 1 to 15 $\mu$m.

The film according to the invention are particularly advantageously used as electrode materials in electrochemical cells. Based on the effect of electrochemical irreversibility of the treated regions, it is possible to produce electrodes in which the sheet-like conductor is a direct part of the film. In fact, the acid-treated side I of the film is connected directly to a voltage source, while the untreated surface II is in direct contact with the electrolyte solvent used. The surface in direct contact with the electrolyte solvent can be reversibly charged and discharged electrochemically, i.e. reversible incorporation and removal of the mobile counterions is possible. Regardless of the electrochemical processes taking place in that region of the film which has not been acid-treated, the acid-treated part of the film remains highly electrically conductive since no incorporation and removal of acid anions occurs. It is important to point out that the discharge process is completely irreversible only in organic electrolyte solvents; in aqueous electrolytes or electrolyte solvents having a high water content, it is also possible to charge and discharge acid-treated layers, so that the advantageous effects of the novel films are not so pronounced here.

Accordingly, the novel films of electrically conductive polymers can be used as electrodes with a directly integrated sheet-like conductor in electrochemical cells containing an organic electrolyte. The conductivity of the acid-treated layer is independent of the electrochemical charge state and is sufficiently high to achieve rapid charging and discharging, i.e. a satisfactory power density of the electrochemical cell. Since the reversibly oxidizable material and the integrated conductor are merely two parts of one and the same film, both intimate attachment (contacting) and excellent mechanical adhesion are ensured. Furthermore, the corrosion problems encountered when metals are used as conductors are likewise absent.

Moreover, large-scale series production of electrodes of this type is substantially simpler since one component, i.e. the conductor, as well as one process step, i.e. producing contact between the conductor and the active electrode material over an area, are dispensed with.

Depending on the embodiment, both electrodes of an electrochemical cell or only one of the electrodes may be composed of the films according to the invention. Suitable counterelectrodes are the conventionally used alkaki metal electrodes or carbon fibers, as are known per se.

In addition to the use of the novel films as active electrode material in electrochemical cells, the differing conductivity of the novel films, which is due to the fact that they are composed of two regions, can also be utilized for other purposes. Layer elements consisting of a dielectric with an integrated conductor may be mentioned here merely by way of example. If the reversible chargeable and dischargeable part of a novel film is discharged, this part, as an insulator, possesses a high dielectric constant, whereas the acid-treated part has a comparatively high conductivity.

EXAMPLE 1

A 25 $\mu$m thick polypyrrole film complexed with phenyl sulfonate and having an electrical conductivity of 100 S/cm was immersed in 10% strength by weight aqueous sulfuric acid. After treatment for ten minutes, the conductivity had increased to about 110 S/cm. When installed in an electrochemical cell, no discharge was possible, in contrast to the untreated film.

EXAMPLE 2

The polypyrrole film from Example 1 was treated only on one side with 10% strength by weight aqueous sulfuric acid. The conductivity of the film was unchanged thereafter. A platinum wire was used as the conductor, and this electrode was installed in an electrochemical cell containing lithium as the counterelectrode and propylene carbonate/LiClO$_4$ as the electrolyte; the polypyrrole film could be discharged by applying an appropriate potential difference. The kinetics of the subsequent charging process were similar to those of a film contacted over an area with platinum sheet.

EXAMPLE 3

A 50 μm thick polypyrrole film complexed with ClO$_4^-$ was exposed to a 10% strength by weight aqueous sulfuric acid on one side. After treatment for five minutes, virtually complete exchange of the ClO$_4^-$ anion for HSO$_4^-$ had taken place in a layer about 5 μm thick, as was shown by energy-dispersive X-ray analysis. The film treated in this manner behaved similarly to the electrode described in Example 2.

I claim:

1. A single film of a 5-membered or 6-membered heterocycle unit-based electrically conductive polymer having two zones,
    (A) a zone I which corresponds to a first major surface of said single film, which has been treated on one side with an aqueous acid, contains incorporated counterions, whose thickness is 1–60% of the total thickness of the film, and which cannot be subjected to reversible electrochemical discharge, and
    (B) an electrochemically reversibly oxidizable zone II which corresponds to a second major surface of said single film which is parallel to said first major surface and whose thickness is 40–99% of the total thickness of the single film;
    wherein said 5-membered and said 6-membered heterocycle units contains, as the heteroatom, an oxygen atom, a nitrogen atom, or a sulfur atom.

2. The film of claim 1, wherein the thickness of the zone I is from 2 to 10% of the total thickness of the film.

3. A film as claimed in claim 1, wherein the electrically conductive polymer is a polymer of pyrrole, of furan, of thiophene or of aniline.

4. The film of claim 3, wherein said electrically conductive polymer is a polymer of pyrrole.

5. The film of claim 3, wherein the electrically conductive polymer is a polymer of furan.

6. The film of claim 3, wherein said electrically conductive polymer is a polymer of thiophene.

7. The film of claim 3, wherein said electrically conductive polymer is a polymer of aniline.

8. The film of claim 1, wherein said incorporated counterions comprise HSO$_4^-$.

9. The film of claim 1, wherein said electrically conductive polymer is a polymer of a 5-membered heterocycle containing oxygen.

10. The film of claim 1, wherein said electrically conductive polymer is a polymer of a 5-membered heterocycle containing nitrogen.

11. The film of claim 1, wherein said electrically conductive polymer is a polymer of a 5-membered heterocycle containing sulfur.

12. The film of claim 1, wherein said electrically conductive polymer is a polymer of a 6-membered heterocycle containing oxygen.

13. The film of claim 1, wherein said electrically conductive polymer is a polymer of a 6-membered heterocycle containing nitrogen.

14. The film of claim 1, wherein said electrically conductive polymer is a polymer of a 6-membered heterocycle containing sulfur.

15. The film of claim 1, wherein said zone I is treated on one side of with an aqueous acid having a pH of less than 4.

16. The film of claim 1, wherein said zone I is treated on one side with aqueous sulfuric acid.

17. The film of claim 1, wherein said zone I is treated on one side with aqueous hydrochloric acid.

18. The film of claim 1, wherein said zone I is treated on one side with an aqueous acid having a pH of less than 4, wherein said aqueous acid comprises phosphoric acid, acetic acid or trichloroacetic acid.

19. The film of claim 1, wherein said film has a thickness of from 10 to 150 μm.

20. The film of claim 1, wherein said acid-treated region has a thickness of from 0.1 to 90 μm.

21. The film of claim 1, wherein said acid-treated region has a thickness of from 1 to 15 μm.

22. A laminated film having two layers (I) and (II);
    wherein each layer is, independently, a 5-membered or 6-membered heterocycle unit-based electrically conductive polymer;
    wherein layer (I) has been treated with an aqueous acid, contains incorporated counterions, has a thickness which is 1 to 60% of the thickness of said laminated film, and cannot be subjected to reversible electrochemical discharge;
    wherein layer (II) is electrochemically reversibly oxidizable, and has a thickness which is 99 to 40% of the thickness of said laminate film; and
    wherein said 5-membered and said 6-membered heterocycle unit contains, as the heteroatom, an oxygen atom, a nitrogen atom, or a sulfur atom.

* * * * *